(12) United States Patent
Woolard et al.

(10) Patent No.: US 8,076,404 B2
(45) Date of Patent: Dec. 13, 2011

(54) RUBBER COMPOSITIONS

(75) Inventors: Christopher Dennis Woolard, Port Elizabeth (ZA); Katherine Garde, Port Elizabeth (ZA); Robert Michael Bosch, Port Elizabeth (ZA)

(73) Assignee: Rubber Nano Products (Proprietary) Limited (ZA)

( * ) Notice: Subject to any disclaimer, the term of this patent is extended or adjusted under 35 U.S.C. 154(b) by 0 days.

(21) Appl. No.: 12/302,014

(22) PCT Filed: May 22, 2007

(86) PCT No.: PCT/IB2007/051933
§ 371 (c)(1), (2), (4) Date: Aug. 5, 2010

(87) PCT Pub. No.: WO2007/135650
PCT Pub. Date: Nov. 29, 2007

(65) Prior Publication Data
US 2010/0292370 A1    Nov. 18, 2010

(30) Foreign Application Priority Data

May 23, 2006    (ZA) .................................. 2006/04137

(51) Int. Cl.
*C08K 3/22*    (2006.01)
*C08L 9/00*    (2006.01)

(52) U.S. Cl. .......................... 524/430; 524/432; 524/571
(58) Field of Classification Search .................. 524/432, 524/571, 430
See application file for complete search history.

(56) References Cited

U.S. PATENT DOCUMENTS

2005/0027054 A1 *    2/2005    Zimmer et al. ............... 524/432

FOREIGN PATENT DOCUMENTS

| CN | 1386788 A | * | 12/2002 |
| EP | 1 505 115 A1 |  | 2/2005 |

OTHER PUBLICATIONS

A.A. Mukhitdinov, et al., "Possibility of reducing the amount of zinc oxide in rubber mix formulations," International Polymer Science and Technology, vol. 21, No. 7 (1994).

* cited by examiner

*Primary Examiner* — Ling-Siu Choi
(74) *Attorney, Agent, or Firm* — Kilpatrick Townsend & Stockton LLP.; M. Henry Heines

(57) ABSTRACT

The present invention relates to rubber compositions containing a filler and comprising (i) at least one rubber containing olefinic unsaturation and (ii) functionalized nano transition metal oxide and/or sulfide particles. The invention further relates to a method of manufacture of the rubber compositions and to the use of the compositions in tires, belts and/or hoses.

32 Claims, 3 Drawing Sheets

RUBBER COMPOSITIONS

CROSS REFERENCE TO RELATED APPLICATIONS

This application is a National Stage of International Application No. PCT/IB32007/051933 filed May 22, 2007 and which claims the benefit of South African Patent Application No. 2006/04137, the disclosures of all applications being incorporated herein by reference.

INTRODUCTION

The present invention relates to rubber compositions containing functionalized nano transition metal oxide and/or sulfide material. In particular, the present invention relates to rubber compositions containing functionalized nano zinc oxide and/or nano zinc sulfide particles, their use as or in rubber components, especially after sulfur vulcanization, and methods to produce such rubber compositions.

BACKGROUND OF THE INVENTION

Nanomaterials are materials with particles having a diameter from 1 to 100 nanometers. The use of such nanomaterials in rubber is known from U.S. Pat. No. 4,644,988 describing a tire tread compound containing a styrene-butadiene copolymer rubber reinforced with carbon black with a particle size smaller than 20 nanometers. U.S. Pat. Nos. 6,121,346 and 6,225,397 disclose the use of silica fillers with primary particles having a particle size in the range of from 5 to 30 nanometers in a rubber also comprising zinc oxide in an amount of 2 phr to 5 phr.

A method to produce a nanoscaled zinc oxide with a mean particle diameter of from 5 nanometers to 10 nanometers starting from commercially available, comparatively cheap educts is described in DE 199 07 704 A1. These zinc oxide particles can be redispersed in water, organic solvents or mixtures with organic solvents or surface modifying substances in order to get a solution with a large extent of primary particles.

The increasing concern regarding the potential environmental and health effects of the release of zinc oxide (ZnO), which is also often accompanied by a release of cadmium, makes it desirable to reduce the ZnO content in rubber compositions, especially in rubber compositions used in the production of tires, but also to retain the positive effects of ZnO in the curing/vulcanization process.

SUMMARY OF THE INVENTION

The present invention relates to rubber compositions containing functionalized nano transition metal oxide and/or sulfide particles, their use as or in rubber components, for example tires, especially after sulfur vulcanization, and methods to produce such rubber compositions.

The term functionalized nano transition metal oxide and/or zinc particles refers to a material containing a transition metal, preferably Zn, and C, H, S, N and/or O. The base particle is hexagonal transition metal oxide or sulfide, for example ZnO or ZnS, of particle size less than 100 nm. The surface contains the presence of functionalized (end capped) groups, for example, of 2-mercaptobenzothiazole (MBT), zinc bis(2-mercaptobenzothiolate) and other zinc oxide-2mercaptobenzothiazole complexes.

Other suitable end capping agents include bis-benzothiazole-2,2'-disulfide, N-oxydiethylene-2-benzothiazole-sulfenamide, N-oxydiethylenethiocarbamoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylethiourea and 1,3-dibutylthiourea.

The functionalized nano transition metal oxide or sulfide, for example ZnO or ZnS material, can replace ZnO in rubber formulations in part or in full. The material can also be used in much lower loadings than ZnO and can act as an accelerator unlike ZnO which requires the presence of an accelerator. The material can act as a secondary accelerator in combination with known accelerators used in sulfur cures, for example 2-mercaptobenzothiazole (MBT). The material also significantly lowers cure scorch times at equivalent ZnO loadings.

DETAILED DESCRIPTION OF THE INVENTION

Figure 1:
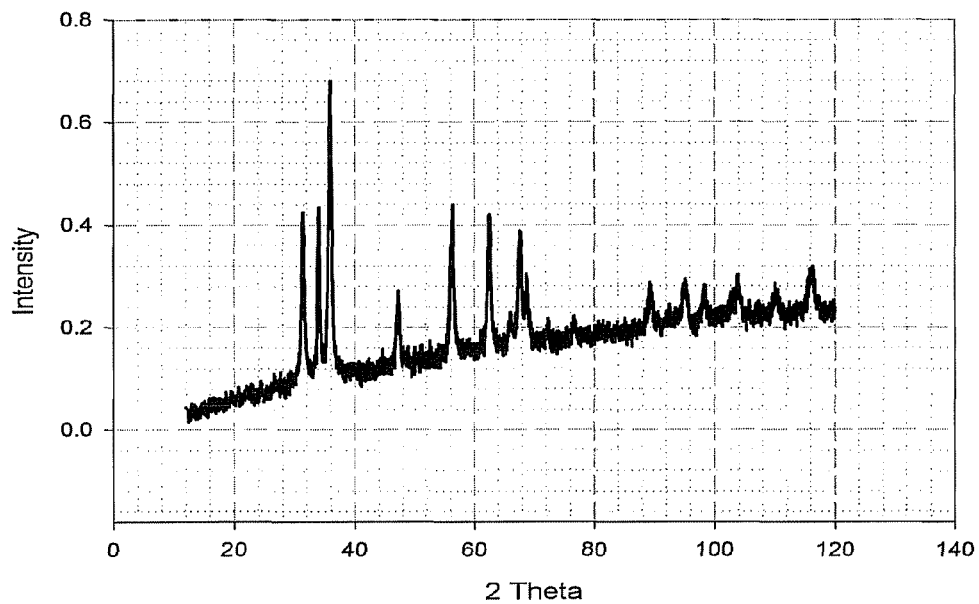
FIG. 1 is a plot of an x-ray diffraction analysis of 2-mercaptobenzothiazole-capped ZnO.

According to a first aspect to the present invention there is disclosed a rubber composition containing a filler comprising at least one rubber containing olefinic unsaturation and functionalized nano transitional metal oxide and/or sulfide particles.

The rubber composition may be a sulfur-vulcanized rubber composition. The sulfur-vulcanized rubber composition may be prepared by heating the rubber composition according to the invention to a temperature of 100° C. or greater to 200° C. or less in the presence of a sulfur-vulcanizing agent.

According to a second aspect to the present invention there is provided a method of processing a rubber composition containing at least one rubber containing olefinic unsaturation with functionalized nano transition metal oxide and/or sulfide particles. The method of processing the rubber composition containing at least one rubber containing olefinic unsaturation and functionalized nano transition metal oxide and/or sulfide particles may include processing with a processing additive.

The term "phr" as used herein, and according to conventional practice, refers to "parts by weight of a respective material per 100 parts by weight of rubber, or elastomer."

Preferably the rubber composition comprises less than 2 phr, preferably less than 1.9 phr, more preferably less than 1.8 phr, most preferably less than 1.7 phr of the functionalized nano transition metal oxide and/or sulfide particles. It will be appreciated that higher loadings may be used, although such higher loadings are counterintuitive to the aim of the present invention. The rubber composition may include greater than 0.1 phr, preferably greater than 0.2 phr, more preferably greater than 0.3 phr and most preferably greater than 0.5 phr of functionalized nano transition metal oxide and/or sulfide particles.

In a preferred aspect of this invention, the functionalized nano transition metal oxide and/or sulfide particles have a diameter of less than 100 nanometers.

The functionalized nano transition metal oxide and/or sulfide particles may be used to process sulfur-vulcanizable rubbers or elastomers containing olefinic unsaturation. The phrase "rubber or elastomer containing olefinic unsaturation" is intended to include both natural rubber and its various raw and reclaim forms as well as various synthetic rubbers, including but not limited to synthetic polyisoprene, polybutadiene and styrene butadiene rubber. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polyisoprene, polybutadiene and SBR.

In one embodiment of the first aspect to the present invention, the rubber composition is preferably comprised of at least two of diene based rubbers. A combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. The 3,4-polyisoprene rubber (3,4-PI) is considered beneficial for a purpose of enhancing a tire's traction when it is used in a tire tread composition. The 3,4-PI, and use thereof, is more fully described in U.S. Pat. No. 5,087,668. The cis 1,4-polybutadiene rubber (BR) is considered to be beneficial for a purpose of enhancing a tire tread's wear.

It is readily understood by those having skill in the art that the rubber composition can be compounded by methods generally known in the rubber compounding art, such as mixing the various sulfur-vulcanizable constituent rubbers with various commonly used additive materials such as, for example, sulfur donors, curing aids, such as accelerators, activators and retarders, and processing additives, such as oils, resins including tackifying resins and plasticizers, fillers, pigments, fatty acid, waxes, antioxidants and antiozonants and peptizing agents.

As known to those skilled in the art, depending on the intended use of the sulfur-vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise 0.5 to 10 phr, usually 1 to 5 phr. Typical amounts of processing aids comprise 1 phr to 50 phr. Such processing aids can include, for example, aromatic, naphthenic, and/or paraffinic processing oils. Typical amounts of antioxidants comprise 1 to 5 phr. Representative antioxidants may be, for example, diphenyl-p-phenylenediamine and others, such as, for example, those disclosed in *The Vanderbilt Rubber Handbook* (1978), pages 344 to 346. Typical amounts of antiozonants comprise 1 to 5 phr. Typical amounts of fatty acids, if used, which can include stearic acid, comprise 0.5 to 3 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

In one embodiment of the first aspect of the present invention, the rubber composition is sulfur-cured or vulcanized. Accelerators may be used to control the time and/or temperature required for vulcanization and to improve the properties of the vulcanizate. In the present invention, the functionalized nano transition metal oxide and/or sulfide can act as an accelerator rendering the addition of further accelerants redundant. In an alternative embodiment, a further single accelerator system (in addition to the nano transition metal oxide and/or sulfide) may be used, i.e. primary accelerator. The primary accelerator(s) may be used in total amounts ranging from 0.5 to 4, preferably 0.8 to 1.5, phr. In another embodiment, in addition to the functionalized nano transition metal oxide and/or sulfide, combinations of a primary and a secondary accelerator might be used with the secondary accelerator being used in smaller amounts, such as from 0.05 to 3 phr, in order to activate and to improve the properties of the vulcanizate. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Vulcanization of the rubber composition of the present invention is preferably conducted at temperatures ranging from 110° C. to 200° C.

Any of the usual vulcanization processes may be used such as heating in a press or mold, heating with superheated steam or hot air or in a salt bath.

According to a third aspect to the present invention there is provided use of the rubber composition for various purposes. For example, rubber composition, preferably sulfur-vulcanized, may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

According to the second aspect to the present invention, functionalized nano transition metal oxide and/or sulfide particles are prepared according to the teaching of applicants' co-pending application ZA2006/04138 and these particles may be mixed with a processing additive like a wax, a fatty acid, a resin, or, preferably, an oil leading to a sol with dispersed functionalized nano transition metal oxide and/or sulfide particles therein. Then, this mixture is added to a prepared rubber composition containing the filler in the non-productive stage. The amount of transition metal oxide and/or sulfide in the mixture with the processing additive is such that the rubber composition comprises 0.1 to 1.0 phr, for example 0.8 phr, 0.6 phr or 0.4 phr, of transition metal oxide and/or sulfide after mixing. This process uses the possibility to redisperse nanoscaled transition metal oxide and/or sulfide particles prepared according to applicants' co-pending application in organic materials, for example a usual processing additive in the rubber mixing art, and then to introduce the transition metal oxide and/or sulfide together with the processing additive into the prepared rubber composition preferably in the non-productive stage.

In summary, this process allows a considerable reduction of transition metal oxide and/or sulfide in the rubber composition, if desired, without negative impact on the following curing or vulcanization process due to the high dispersivity and high chemical activity of the nanoscaled transition metal oxide and/or sulfide particles. In addition, the inclusion of further accelerants can be avoided, if desired.

In an alternative embodiment to the second aspect of the present invention, functionalized nano transition metal oxide and/or sulfide particles are prepared according to the teaching of applicants' co-pending application ZA2006/04138 and then added to a master batch including at least one polymer. The preparation of such a master batch is described in more detail in U.S. Pat. No. 6,555,606, the contents of which are included herein by reference. Preferably, the polymer is one of the polymers intended to be added to the rubber composition. This master batch is then mixed with a prepared rubber composition, preferably in the non-productive stage. The amount of transition metal oxide and/or sulfide in the master batch is such that the rubber composition comprises 0.1 to 1.0 phr, for example 0.8 phr, 0.6 phr or 0.4 phr, of transition metal oxide and/or sulfide after mixing.

Again, this process allows a considerable reduction of transition metal oxide and/or sulfide in the rubber composition, if desired, without negative impact on the following curing or vulcanization process due to the high dispersivity and chemical activity of the nanoscaled transition metal oxide and/or sulfide particles. In addition, the inclusion of further accelerants can be avoided, if desired.

The invention will now be described with reference to the following figures in which:

FIG. 1 is an XRD pattern of 2-mercaptobenzothiazole capped ZnO consistent with base particle being hexagonal ZnO. XRD does not reveal the presence of capping agent. This is revealed by thermogravimetric analysis (TGA) where weight loss is measured as a function of temperature. The decomposition of different components is indicated by peaks in the derivative curve. Organic matter will decompose during heating whereas pure ZnO shows no mass loss except for the loss of adsorbed water below 100° C.

Figure 2:
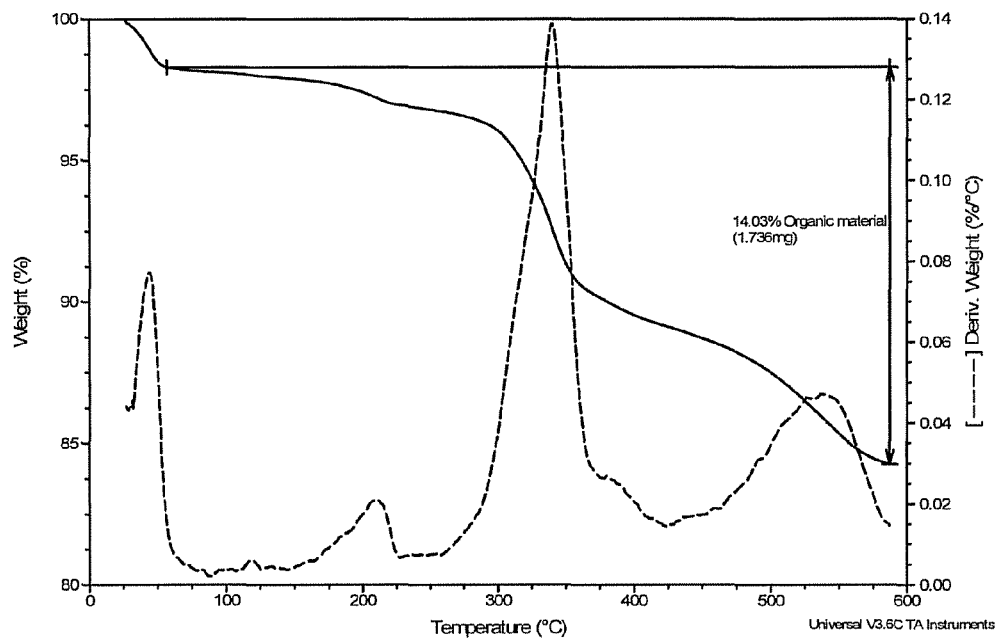
FIG. 2 is a thermogravimetric analysis curve for a sample in accordance with the present invention.

FIG. 2 is a TGA curve below is for a Sample 1 (below) heated at 10° C. min$^{-1}$ in nitrogen. The mass loss below 100° C. is adsorbed water. That near 220° C. is of adsorbed 2-mercaptobenzothiazole. That centered on 340° C. is consistent with the formation of zinc bis(2-mercaptobenzothiazolate) $(Zn_2(mbt)_4$. The decomposition near 380° C. indicates the presence of a complex between zinc and 2-mercaptobenzothiazole of indeterminate form. The large mass loss (14%) indicates the presence of an organic capping agent on the surface of the ZnO.

Figure 3:
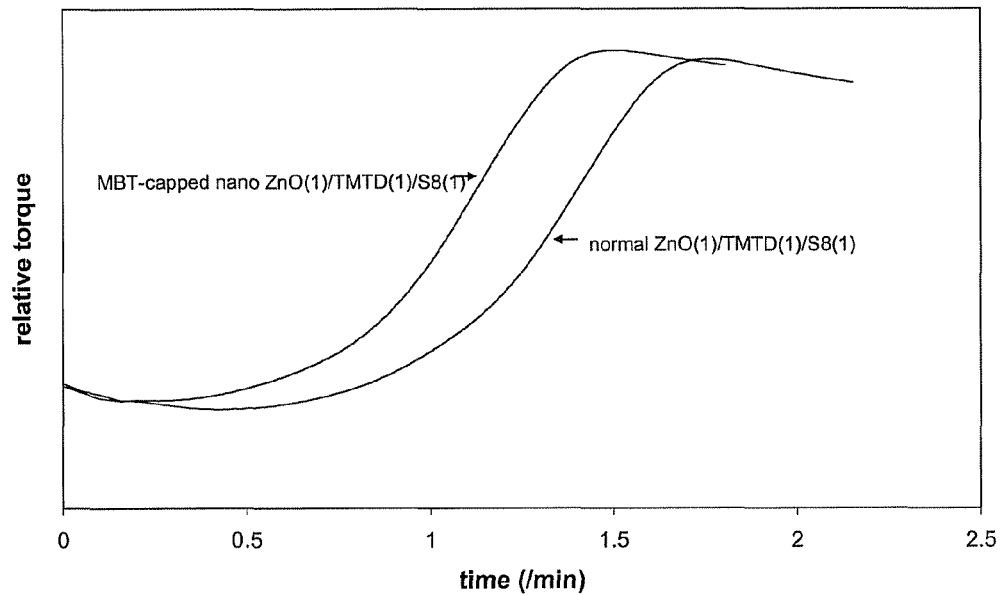
FIG. 3 is a plot of torque vs. time comparing a rubber compound containing 2-mercaptobenzothiazole-capped ZnO with the same rubber compound containing uncapped ZnO.

FIG. 3 compares the curing of compounds A and B in the Examples below at 190° C.

Figure 4:
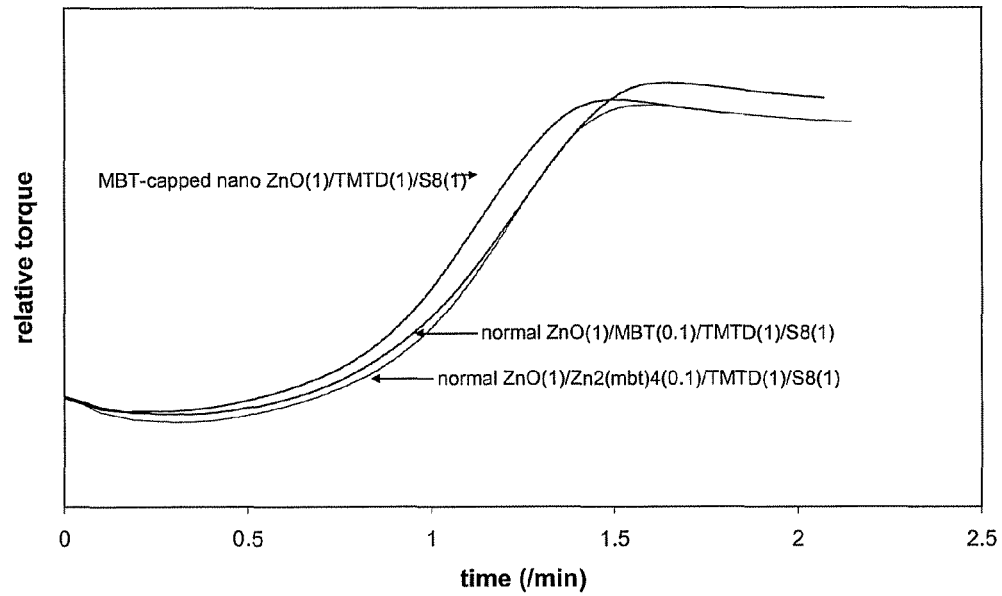
FIG. 4 is a plot of torque vs. time further comparing a rubber compound containing 2-mercaptobenzothiazole-capped ZnO with the same rubber compound containing uncapped ZnO.

FIG. 4 shows that although there has been some reduction in the onset of cure relative to plain ZnO, the MBT-capped nano ZnO formulation is still the fastest.

Figure 5:
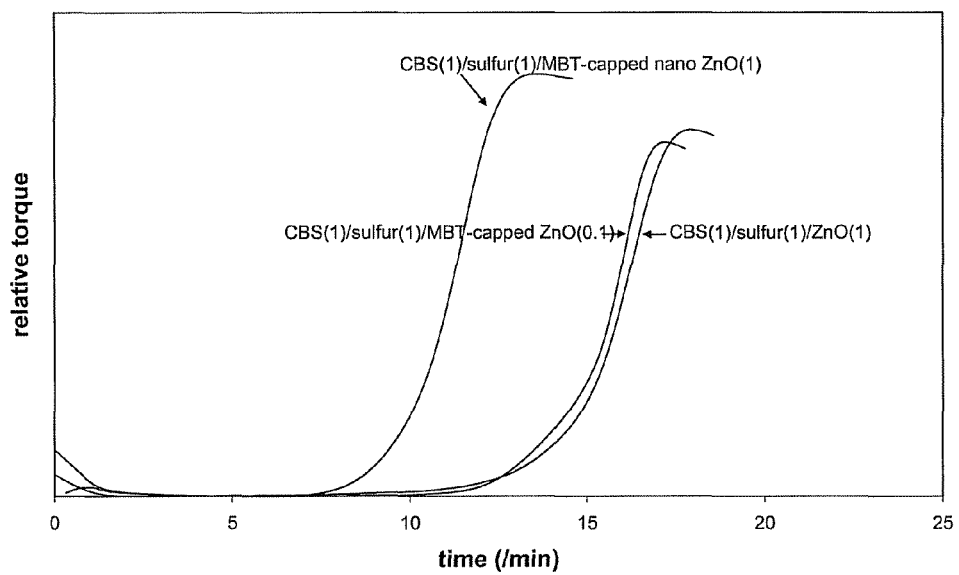
FIG. 5 is a plot rheometer cure curves comparing a rubber compound containing 2-mercaptobenzothiazole-capped ZnO with the same rubber compound containing uncapped ZnO.

FIG. 5 is an overlay of the rheometer cure curves.

The invention will now be described with reference to the following non-limiting examples.

The following rubber compounds were prepared

| Sample | A | B |
|---|---|---|
| cis-polyisoprene (IR) | 100 phr | 100 phr |
| tetramethylthiuram disulfide (TMTD) | 1 phr | 1 phr |
| sulfur | 1 phr | 1 phr |
| Normal zinc oxide | 1 phr | — |
| MBT-capped nano zinc oxide | — | 1 phr |

FIG. 3 compares the curing of compounds A and B at 190° C. In particular, FIG. 3 shows that the onset of curing is reduced by the inclusion of MBT-capped nano ZnO.

Because the surface contains some 2-mercaptobenzothiazole, two further control compounds were prepared using normal zinc oxide. These contained some additional 2-mercaptobenzothiazole (MBT) or zinc bis(2-mercaptobenzothiazolate) $(Zn_2(mbt)_4)$

| Sample | C | D |
|---|---|---|
| cis-polyisoprene (IR) | 100 phr | 100 phr |
| tetramethylthiuram disulfide (TMTD) | 1 phr | 1 phr |
| sulfur | 1 phr | 1 phr |
| Normal zinc oxide | 1 phr | 1 phr |
| 2-mercaptobenzothiazole (MBT) | 0.1 phr | — |
| zinc bis(2-mercaptobenzothiazolate) | — | 0.1 phr |

FIG. 4 shows that although there has been some reduction in the onset of cure relative to plain ZnO, the MBT-capped nano ZnO formulation is still the fastest.

Below is a comparison of cure data. $\tau_5$ is the time taken for the change in torque (with respect to the minimum torque) to reach 5% of the difference in torque between minimum and maximum. $\tau_{95}$ is similar but for 95%.

| Sample | A | B | C | D |
|---|---|---|---|---|
| $\tau_5$ (/s) | 45 | 33 | 37 | 36 |
| $\tau_{95}$ (/s) | 98 | 90 | 90 | 87 |
| Rate of cure* | 100 | 112 | 102 | 111 |
| Torque increase* | 100 | 100 | 107 | 102 |

*Sample A set equal to 100

Rate of cure is determined from the maximum slope of the torque time curve.

Of the samples, sample B displays the earliest onset and fastest rate of cure.

To better elucidate the effects of nano ZnO the curing temperature was lowered to 150° C. This lower temperature would display greater differences if any existed. The accelerator was also changed to N-cyclohexyl-2-benzothiazole sulfenamide (CBS)

Three samples were prepared

| Sample | E | F | G |
|---|---|---|---|
| cis-polyisoprene (IR) | 100 phr | 100 phr | 100 phr |
| CBS | 1 phr | 1 phr | 1 phr |
| sulfur | 1 phr | 1 phr | 1 phr |
| Normal zinc oxide | 1 phr | — | — |
| MBT-capped nano zinc oxide | — | 1 phr | 0.1 phr |

Sample G was expressly formulated to see if the properties of E could be mimicked with lower nano ZnO loadings. FIG. 5 is an overlay of the rheometer cure curves.

It is apparent that at the same loadings, the MBT-capped nano ZnO significantly reduces the onset of curing. Reducing the ZnO loading by 90% to 0.1 phr produces a cure that has the same characteristics as 1.0 phr ZnO.

The cure behavior can be summarized as

| Sample | E | F | G |
|---|---|---|---|
| $\tau_5$ (/min:s) | 12:31 | 8:42 | 12:29 |
| $\tau_{95}$ (/min:s) | 17:05 | 12:38 | 16:43 |
| Rate of cure* | 100 | 117 | 119 |
| Torque increase* | 100 | 115 | 97 |

*Sample E set equal to 100

Rate of cure is determined from the maximum slope of the torque time curve.

The data clearly shows that the onset of cure ($\tau_5$) is greatly reduced. Furthermore curing is complete with MBT-capped ZnO before curing has even begun using normal nano-ZnO. Sample G shows that reducing the zinc oxide loading 90% can still give the cure behavior of normal zinc oxide. The rate of cure is slightly increased by the capped nano ZnO.

The invention claimed is:

1. A rubber composition containing a filler and comprising: (i) at least one rubber containing olefinic unsaturation and (ii) functionalized nano transition metal oxide and/or sulfide particles, wherein the functionalized nano transition metal oxide and/or sulfide particles are end-capped nano transition metal oxide and/or sulfide particles with a capping agent selected from the group consisting of 2-mercaptobenzothiazole, bis-benzothiazole-2,2'-disulfide, N-oxydiethylene-2-benzothiazole-sulfenamide, N-oxydiethylenethiocarbamoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylthiourea, and 1,3-dibutylthiourea.

2. The rubber composition according to claim 1 wherein the at least one rubber containing olefinic unsaturation is sulfur-vulcanizable.

3. The rubber composition according to claim 1 wherein the rubber composition is a sulfur-vulcanized composition.

4. The rubber composition according to claim 1 wherein the composition is prepared by heating the composition to a temperature ranging from 100° C. to 200° C. in the presence of a sulfur vulcanizing agent.

5. The rubber composition according to claim 1 wherein the at least one rubber containing olefinic unsaturation is selected from the group consisting of natural rubber, including raw and reclaimed forms, and synthetic rubber.

6. The rubber composition according to claim 1 wherein the at least one rubber containing olefinic unsaturation is comprised of at least two diene based rubbers.

7. The rubber composition according to claim 1 wherein the rubber composition comprises less than 2 phr of functionalized nano transition metal oxide and/or sulfide particles.

8. The rubber composition according to claim 1 wherein the rubber composition comprises greater than 0.1 phr of functionalized nano transition metal oxide and/or sulfide particles.

9. The rubber composition according to claim 1, wherein the functionalized nano transition metal oxide and/or sulfide particles have a diameter of less than 100 nm.

10. The rubber composition according to claim 1 further comprising one or more additives selected from sulfur donors, curing aids selected from the group consisting of accelerators, activators, and retarders, and processing additives selected from the group consisting of oils, tackifying resins, plasticizers, fillers, pigments, fatty acids, waxes, antioxidants, antiozonants and peptizing agents.

11. A method of processing a rubber composition containing a filler, said method comprising mixing together (i) at least one rubber containing olefinic unsaturation and (ii) functionalized nano transition metal oxide and/or sulfide particles,
wherein the functionalized nano transition metal oxide and/or sulfide particles are end-capped nano transition metal oxide and/or sulfide particles with a capping agent selected from the group consisting of 2-mercaptobenzothiazole, bis-benzothiazole-2,2'-disulfide, N-oxydiethylene-2-benzothiazole-sulfenamide, N-oxydiethylenethiocarbamoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylthiourea, and 1,3-dibutylthiourea.

12. The method according to claim 11 further comprising mixing a primary accelerator with said at least one rubber and said particles.

13. The method according to claim 12 wherein the primary accelerator is used in a total amount ranging from 0.5 to 4 phr.

14. The method according to claim 13 wherein the primary accelerator is used in a total amount ranging from 0.8 to 1.5 phr.

15. The method according to claim 12 wherein the primary accelerator is selected from the group consisting of amines, disulfides, guanidines, thioureas, thiazoles, thiurams, sulfenamides, dithiocarbamates and xanthates.

16. The method according to claim 12 further comprising mixing a secondary accelerator with said at least one rubber, said particles, and said primary accelerator.

17. The method according to claim 16 wherein the secondary accelerator is used in a total amount ranging from 0.5 to 4 phr.

18. The method according to claim 17 wherein the secondary accelerator is used in a total amount ranging from 0.8 to 1.5 phr.

19. The method according to claim 16 wherein the secondary accelerator is selected from the group consisting of guanidine, dithiocarbamate or thiuram compounds.

20. The method according to claim 11 further comprising the step of heating the rubber composition to a temperature ranging from 100° C. to 200° C. in the presence of a sulfur vulcanizing agent.

21. The method according to claim 20 wherein said heating is performed in a press or mold with a member selected from the group consisting of superheated steam, hot air, and a salt bath.

22. The method according to claim 20 wherein the sulfur vulcanizing agent is selected from the group consisting of sulfur donors, curing aids, processing additives, resins, fillers, pigments, fatty acid, waxes, antioxidants, antiozonants, and peptizing agents.

23. The method according to claim 22 wherein the sulfur vulcanizing agent is elemental sulfur.

24. The method according to claim 23 wherein the elemental sulfur is used in an amount ranging from 0.5 to 8 phr.

25. The method according to claim 24 wherein the elemental sulfur is used in an amount ranging from 1.5 to 6 phr.

26. The method according to claim 22 wherein a tackifier resin is used in an amount ranging from 0.5 to 10 phr.

27. The method according to claim 26 wherein the tackifier resin is used in an amount ranging from 1 to 5 phr.

28. The method according to claim 22 wherein an antioxidant is used in an amount ranging from 1 to 5 phr.

29. The method according to claim 22 wherein an antiozonant is used in an amount ranging from 1 to 5 phr.

30. The method according to claim 22 wherein a fatty acid is used in an amount ranging from 0.5 to 3 phr.

31. The method according to claim 22 wherein a wax is used in an amount ranging from 1 to 5 phr.

32. The method according to claim 22 wherein a peptizer is used in an amount ranging from 0.1 to 1 phr.

* * * * *